(12) United States Patent
Guinot et al.

(10) Patent No.: US 10,144,192 B2
(45) Date of Patent: Dec. 4, 2018

(54) TAPE WITH SMOOTH DEPLOYMENT

(71) Applicants: THALES, Courbevoie (FR); CENTRE NATIONAL DE LA RECHERCHE SCIENTIFIQUE, Paris (FR); L'ECOLE CENTRALE DE MARSEILLE, Marseilles (FR)

(72) Inventors: François Guinot, Mougins (FR); Stéphane Vezain, Mandelieu (FR); Didier Stanek, Cannes la Bocca (FR); Yannick Baudasse, Grasse (FR); Stéphane Bourgeois, Lyons (FR); Pernelle Marone-Hitz, Lyons (FR)

(73) Assignees: THALES, Courbevoie (FR); CENTRE NATIONAL DE LA RECHERCHE SCIENTIFIQUE, Paris (FR); L'ECOLE CENTRALE DE MARSEILLE, Marseilles (FR)

(*) Notice: Subject to any disclaimer, the term of this patent is extended or adjusted under 35 U.S.C. 154(b) by 92 days.

(21) Appl. No.: 14/980,014

(22) Filed: Dec. 28, 2015

(65) Prior Publication Data

US 2016/0185073 A1    Jun. 30, 2016

(30) Foreign Application Priority Data

Dec. 30, 2014   (FR) ..................... 14 03027

(51) Int. Cl.
*B32B 5/12* (2006.01)
*B32B 5/02* (2006.01)
*B32B 5/26* (2006.01)

(52) U.S. Cl.
CPC ............... *B32B 5/12* (2013.01); *B32B 5/022* (2013.01); *B32B 5/26* (2013.01); *B32B 2250/20* (2013.01); *B32B 2260/023* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2307/308* (2013.01); *B32B 2307/544* (2013.01); *B32B 2307/734* (2013.01); *B32B 2413/00* (2013.01)

(58) Field of Classification Search
CPC ....................................................... B32B 5/12
USPC ....................................................... 428/113
See application file for complete search history.

(56) References Cited

U.S. PATENT DOCUMENTS 3,795,042 A * 3/1974 Kreider ............... B23K 20/04
                                                              228/190
2004/0092183 A1   5/2004 Geva et al.
2005/0153098 A1   7/2005 Bhatnagar et al.

FOREIGN PATENT DOCUMENTS

WO      97/35706 A1   10/1997
WO   2008/105828 A2    9/2008

* cited by examiner

Primary Examiner — Brent T O'Hern
(74) Attorney, Agent, or Firm — Baker & Hostetler LLP

(57) ABSTRACT

A tape having a fully wound stable state and a fully unwound stable state, configured for space applications, the intermediate states between the fully wound state and the fully unwound state comprises a single continuous portion of wound tape with a first radius of curvature greater than a threshold value and a single continuous portion of unwound tape with a second radius of curvature less than the threshold value, the value of the second radius of curvature being continuous over the unwound portio; the tape comprises a stack comprising fibrous layers extending in a longitudinal direction, the resulting stack having symmetry with respect to a longitudinal plane of its fibres to compensate for torsional deformations generated by variations in temperature.

14 Claims, 10 Drawing Sheets

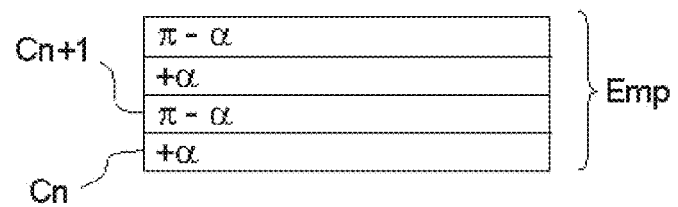
FIG.2b
FIG.4a
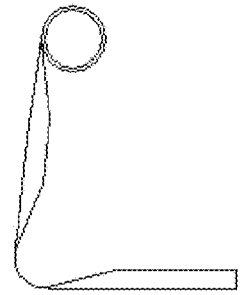
FIG.4b
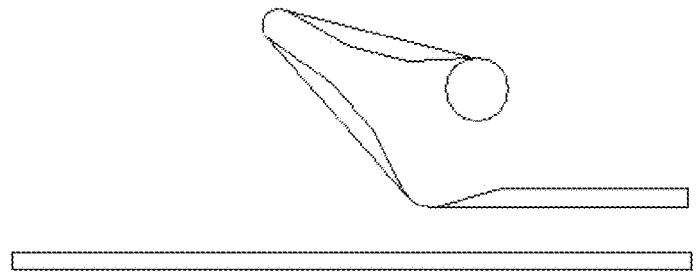
FIG.4c
FIG.4d

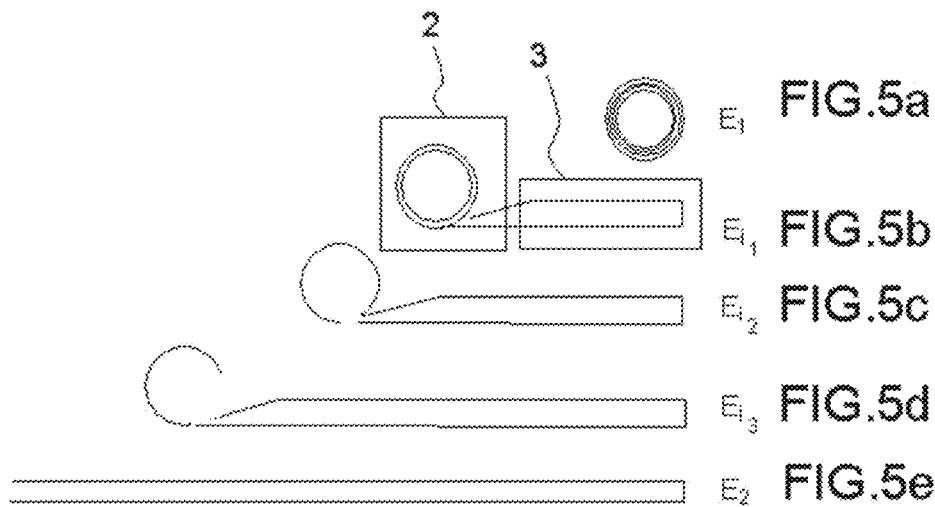
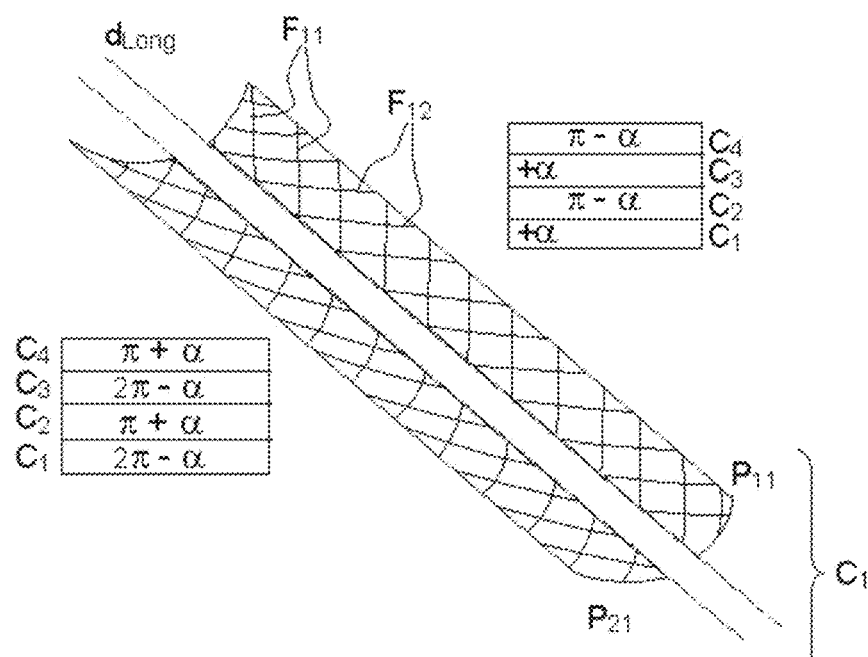
FIG.6

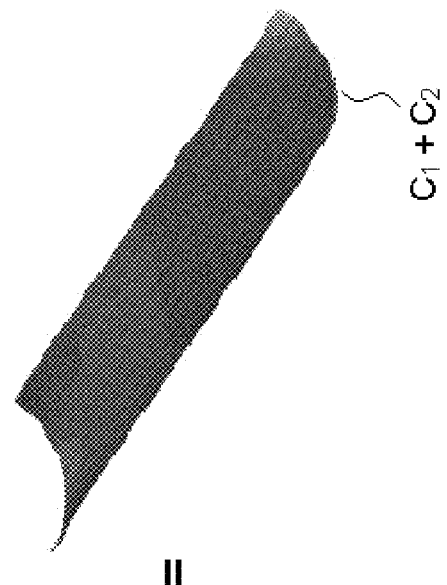
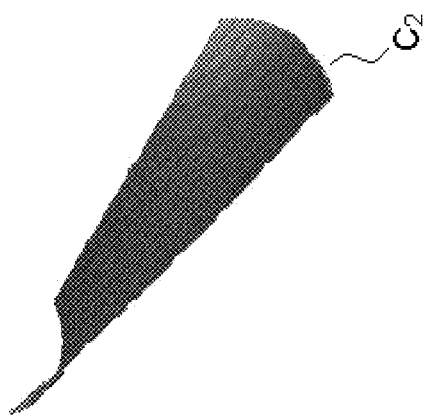
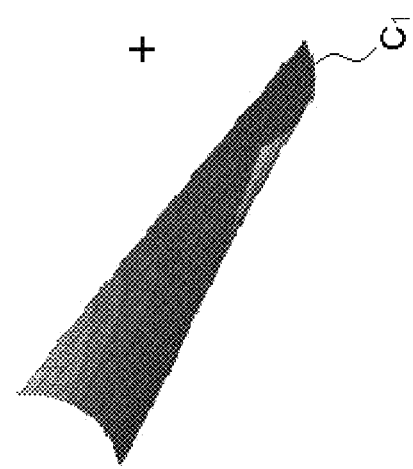
FIG.7

| +α | -α |
|---|---|
| -α | +α |
| 90° ||
| +α | -α |
| -α | +α |

TAPE WITH SMOOTH DEPLOYMENT

CROSS-REFERENCE TO RELATED APPLICATION

This application claims priority to foreign French patent application No. FR 1403027, filed on Dec. 30, 2014, the disclosure of which is incorporated by reference in its entirety.

FIELD OF THE INVENTION

The invention relates to a deployable element configured for applications involving variations in temperature and, more particularly, for space applications in which the amplitude of the temperature may reach 300° C. More specifically, the invention relates to a deployable or unwindable tape, and notably to a bistable tape.

BACKGROUND

What is meant by "tape" 1, depicted in FIG. 1, is a segment of composite material comprising fibres, or of woven material, of elongate shape extending in a longitudinal direction $d_{Long}$ with a thin cross section Sec that is symmetric with respect to the longitudinal direction $d_{Long}$, the thickness of the cross section Sec typically being negligible by comparison with the width and length of the tape 1.

In this particular instance, the tape 1 extends in the longitudinal direction $d_{Long}$ and has a plane of symmetry $P_{sym}$ in the said longitudinal direction $d_{Long}$. It comprises a composite material of which the matrix comprises a resin in which fibres extend.

A document of the prior art, EP0891248, proposes an extendable element that can be configured into a coiled first state in which the element is coiled substantially parallel to a first axis, and into an extended second state in which the element extends substantially parallel to a second axis. The extendable element is made up of a substrate and of at least one fibrous layer of which the fibres are crossed. Each of the fibres is oriented at an angle of between 0 degrees and 90 degrees with respect to the first axis such that when the element is extended in a direction substantially parallel to the second axis, said crossed fibres cause contraction in a direction oriented at a certain angle to the second axis, so as to place the element in the second state.

Let it be noted that all the angular offsets mentioned in the remainder of this application are oriented in the clockwise or negative trigonometric direction.

Moreover, it is also known practice to create tapes 1 by superposing layers comprising a first fibrous material, according to the principle depicted in FIGS. 2a and 2b.

More specifically, FIG. 2a relates to a tape comprising a stack Emp or superposition of four fibrous layers. The direction of orientation of the fibres of one of the layers Cn form an angular offset α with respect to the longitudinal direction $d_{Long}$, the angular offset α being between 0° and 90°. The fibres of the other layer Cn+1 make an angular offset (π−α) with the longitudinal direction $d_{Long}$. In other words, the entirety of one layer comprises at least one first group of fibres of which the direction makes a first angular offset α with the longitudinal direction $d_{Long}$ and the entirety of the next layer comprises the first group of fibres of which the direction forms an angular offset (π−α) with respect to the longitudinal direction $d_{Long}$.

FIG. 2b is a depiction of the stack Emp of FIG. 2a; it is made up of four fibrous layers Cn of which the direction of the fibres forms an angular offset with respect to the longitudinal direction $d_{Long}$, the value of the angular offset alternating between (+α) and (π−α) between the layer Cn and the next layer Cn+1.

This type of antisymmetric tape avoids coupling between bending and torsion but on the other hand is sensitive to temperature variations, as FIGS. 3a and 3b demonstrate.

FIG. 3a schematically depicts a tape 1 comprising two layers of fibrous composite materials of which the fibres of the first layer C1 are oriented in a first direction d1 and the fibres of the second layer C2 are oriented in a second direction d2. Under the effect of an increase in temperature in particular, the layers of composite material C1, C2 each expand in a direction transverse to the direction of the fibres, since the fibres have a very low expansion coefficient, of the order of a few $10^{-6} K^{-1}$, such that twisting of the tape 1 is observed.

FIG. 3b clearly shows the torsion that arises when the tape 1 is subjected to variations in temperature. Specifically, the tape 1 (on the left) which extends in the longitudinal direction $d_{Long}$ has a cross section Sec of which the value of the radius of curvature $r_s$ in a transverse direction $d_{Transv}$ perpendicular to the longitudinal direction $d_{Long}$ is substantially constant over the entire cross section Sec; in other words, the tape 1 has a shape that is uniformly substantially concave. Following an increase in temperature, a greater turning-up of two of the diagonally opposite vertices of the tape 1 may be observed, notably in the right-hand figure.

It will therefore be readily appreciated that a tape 1 that twists in the event of variations in temperature will not be able to be wound and/or unwound cylindrically.

FIGS. 4a-4d depict a process for the deployment of a conventional tape as it passes from a fully wound state in FIG. 4a to a fully unwound state in FIG. 4d, the unwinding process being said to be chaotic. FIGS. 4b and 4c illustrate intermediate states exhibiting several wound zones and/or several unwound zones. The unwinding process is jerky and uneven.

Contrary to the chaotic unwinding process, a process for the unwinding of a tape 1 between a wound first state and an unwound second state is qualified as "smooth" when all of the intermediate states between the first and the second state comprise a single continuous portion of wound tape of which the value of the radius of curvature is higher than a threshold value and a single continuous portion of unwound tape of which the value of the radius of curvature is less than the threshold value and is continuous over the unwound portion. In other words, the unwinding process occurs uniformly with no zone in which the tape 1 is kinked. During the unwinding process, the length of the continuous wound portion of tape decreases over time and that of the continuous unwound portion increases over time.

SUMMARY OF THE INVENTION

It is one object of the invention to alleviate the above-mentioned disadvantages by proposing a tape that can be unwound/wound smoothly in an environment exhibiting significant variations in temperature which may be as high as 300° C.

One aspect of the invention proposes a tape that may have a fully wound stable state and a fully unwound stable state, configured for space applications, all of the intermediate states between the fully wound state and the fully unwound state comprising a single continuous portion of wound tape with a first radius of curvature greater than a threshold value and a single continuous portion of unwound tape with a second radius of curvature less than the said threshold value, the value of the second radius of curvature being continuous over the said unwound portion. The tape comprises a stack comprising fibrous layers extending in a longitudinal direction, the said resulting stack having symmetry with respect to a longitudinal plane of its fibres to make it possible to compensate for torsional deformations generated by variations in temperature. The threshold value for the radius of curvature is dependent on the physicochemical characteristics of the materials of which the tape is made.

Produced in this way the unwinding of the tape can be triggered from one of the ends of the tape. In addition, the tape according to the invention does not require a guide system to allow smooth unwinding. In other words, the smooth unwinding process is down to the intrinsic structural characteristics of the tape.

Advantageously, the unwound portion is rectilinear; in other words, the first radius of curvature is infinite.

According to a first embodiment, the stack comprises at least two layers, the layers comprising a same material comprising two types of unidirectional fibres, with different directions. Advantageously, the stack comprises:

a first layer comprising two parts of which the fibres of the two parts have an orientation that is symmetric with respect to a longitudinal plane Psym, and of which a first part is equipped with a first type of fibres forming a first angular offset and with a second type of fibres forming a second angular offset with respect to the longitudinal direction, and a second layer comprising two symmetric parts positioned respectively facing the two symmetric parts of the first layer comprising the first type of fibres forming a third angular offset with the longitudinal direction and the second type of fibres forming a fourth angular offset with the longitudinal direction, the first angular offset and the third angular offset being supplementary angles.

According to an alternative second embodiment, the stack comprises at least four layers, the layers comprising at least one material comprising unidirectional fibres. Advantageously, the stack comprises:

a first layer comprising two parts of which the fibres of the two parts have a longitudinally symmetric orientation and of which a first part comprises at least a first material comprising fibres forming a first angular offset with respect to the longitudinal direction and a second part comprising at least a second material, and a second layer comprising two symmetric parts positioned respectively facing the two symmetric parts of the first layer and of which a first part comprises the second material, the fibres of the second material forming a third angular offset with the longitudinal direction, the first angular offset and the third angular offset being supplementary angles, the third layer is identical to the first layer and the fourth layer in the direction of the stack is identical to the second layer, the first and the second material having substantially identical expansion coefficients. Preferentially, the first and second materials are identical.

Advantageously, the tape comprises at least two consecutive layers of which the first part of one and the second part of the other are monolithic, making it possible to strengthen the tape and avoid the creation of zones of weakness that may cause the tape to kink.

Advantageously, the tape further comprises a substrate on which the first layer of the stack is positioned.

Advantageously, the tape further comprises a layer comprising a nonwoven material interposed between two fibrous layers of the stack. The addition of a nonwoven layer notably makes it possible to strengthen the structure of the tape or even add elasticity properties to it, for example in order to make it more flexible.

Advantageously, the layers comprise at least two segments separated in a transverse direction perpendicular to the longitudinal direction and comprise different fibrous materials, notably making it possible to modify the first radius of curvature of the wound portion.

Advantageously, the width of the tape in the transverse direction varies in the longitudinal direction, making it easier to wind, notably avoiding the formation of twists.

Advantageously, the radius of curvature in the transverse direction of the tape on the unwound portion varies in the transverse and/or longitudinal direction.

The tape is a bistable tape. What is meant by a "bistable tape" is a tape that deploys smoothly and is stable both in its fully wound state and in its fully unwound state. The bistable tape requires no external force to keep it wound.

BRIEF DESCRIPTION OF THE DRAWINGS

The invention will be better understood and other advantages will become apparent from reading the following description given by way of nonlimiting indication and by studying the attached figures among which:

FIG. 6 depicts a smooth-deployment tape according to the invention, FIG. 7 demonstrates compensation for the intensity of the torsion-generating forces in a tape produced according to the invention.

DETAIL DESCRIPTION

Figure 1:
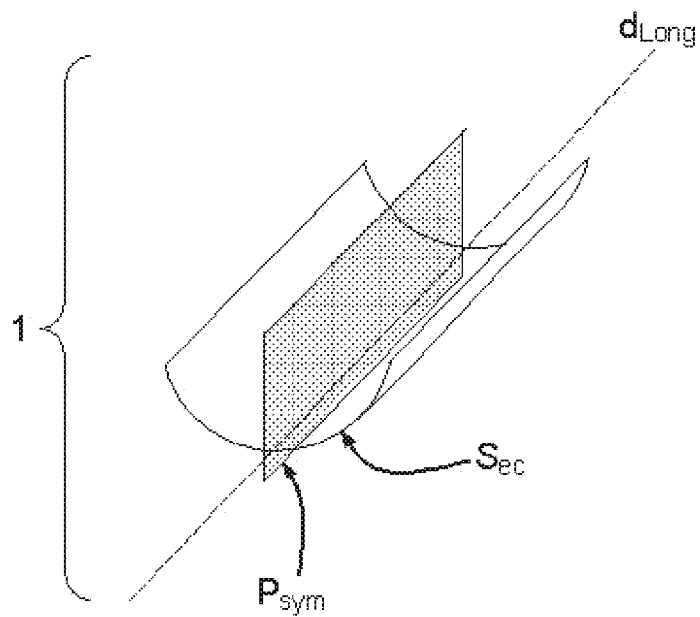
FIG. 1, already described, is a schematic depiction of a tape according to the known art, FIGS. 2a and 2b, already described, are one embodiment of a tape according to the known art, FIGS. 3a and 3b, already described, illustrate the twisting of a tape under the effect of an increase in temperature, according to the known art, FIGS. 4a-4d, already described, illustrate a chaotic deployment process, FIGS. 5a-5e schematically indicate a smooth deployment process within the meaning of the invention.
Figure 2A:
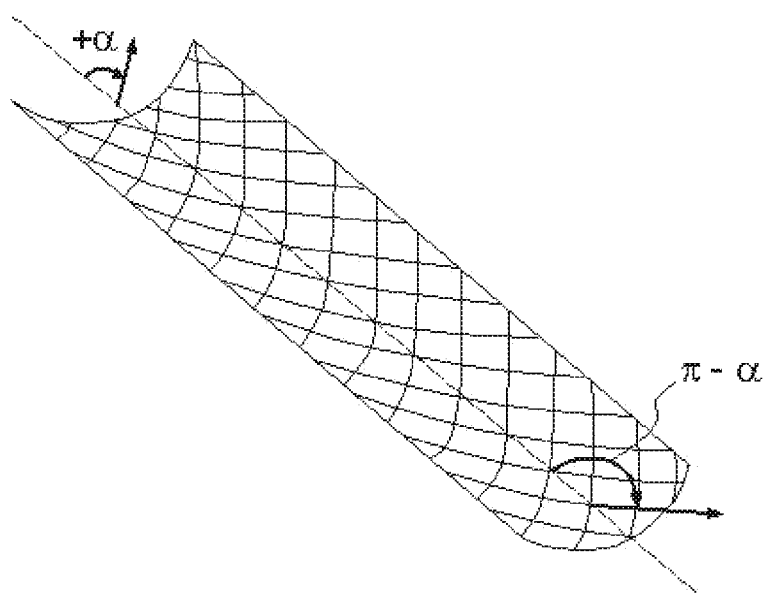
Figure 3A:
Figure 3B:
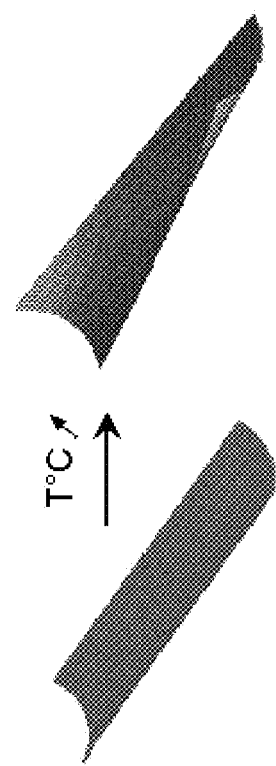

FIGS. 5a-5e depict various states of the tape during a smooth deployment process within the meaning of the invention.

FIG. 5a depicts the tape 1 in its fully wound state $E_1$ having a first radius of curvature r1. FIG. 5b illustrates an intermediate state $Ei_1$, through which the tape 1 passes as it unwinds. The intermediate state $Ei_1$ comprises a single continuous portion of wound tape 2 and a single continuous portion of unwound tape 3 having a second radius of curvature r2. FIGS. 5c and 5d depict more advanced intermediate states $Ei_2$, $Ei_3$ in the unwinding process, the number of turns on the wound portion 2 decreasing as the deployment process progresses, the intermediate states $Ei_2$, $Ei_3$ also comprising a single continuous portion of wound tape 2 and a single continuous portion of unwound tape 3. FIG. 5e illustrates the specific case of the tape 1 in its fully unwound, rectilinear, state $E_2$, the value of the second radius of curvature r2 being infinite. However, the single portion of unwound tape 3 is not necessarily rectilinear; it may have a second radius of curvature r2 the value of which is less than a threshold value $r_s$ and is continuous over the single continuous portion of the unwound tape 3. Thus, the single portion of unwound tape 3 is free of kinked zones.

FIG. 6 illustrates the principle of a smooth-deployment tape according to the invention.

The tape 1 extends in a longitudinal direction $d_{Long}$; it comprises a stack Emp of fibrous layers Cn, n being the layer number, the layers Cn having longitudinal symmetry of their fibres.

Advantageously, the layers comprise a composite material comprising an epoxy or cyanate resin in which carbon, quartz, glass or Kevlar (registered trade mark) fibres extend. Alternatively, the layers comprise a woven material.

A layer Cn therefore comprises two parts: a first P1n and a second part P2n.

The first part P11 of a first layer C1 comprises at least a first type of fibres F11, the direction of the fibres F11 forming an angular offset +α with respect to the longitudinal direction $d_{Long}$.

The first part P12 of a second fibrous layer C2 consecutive with the first layer comprises at least a second type of fibres F12 forming an angular offset (π−α) with respect to the longitudinal direction $d_{Long}$.

The fibres F13 of the first part P13 of the third layer C3 form an angular offset +α with the longitudinal direction $d_{Long}$. The fibres F14 of the first part P14 of the fourth layer C4 form an angular offset of (π−α) with the longitudinal direction $d_{Long}$. The stack of the first parts of the layers is summarized in the table in the top-right of FIG. 6. It may therefore be seen that there is an alternation of values of angular offsets between +α and (π−α).

On the second part P2n of a given layer Cn, the direction of the fibres F2n forms, with respect to the longitudinal direction $d_{Long}$, an angular offset the value of which is the opposite of the angular offset that the direction of the fibres F1n forms in the first part of the layer Cn. In other words, in the first part P11 of the first layer C1 the direction of the fibres forms an angular offset of +α and on the second part P12 of the first layer C1 the direction of the fibres forms an angular offset (2π−α), namely (−α) in the anticlockwise direction. The stack of the second parts of the layers Cn is summarized in the table at the bottom left of FIG. 6. It may therefore be seen that there is an alternation of the values of the fibres between the values (2π−α) and (π+α).

FIG. 7 depicts a smooth-deployment tape according to the invention and demonstrates a low torsional deformation generated by variations in temperature as compared with the tape produced according to the prior art.

In this particular instance, the tape 1 of FIG. 7 comprises two layers Cn. A first layer C1 twists in one direction and a second layer C2 twists in the other direction when the layers are subjected to variations in temperature.

Combining these two layers C1 and C2 means that the torsional deformations can be compensated for overall. The resultant forces of the expansion have substantially equal intensities at all ends of the tape 1 and the tape experiences no torsion. In this particular instance, the plane of symmetry Psym is maintained and there is no rotation of sections about the longitudinal axis of the tape.

Figure 8:
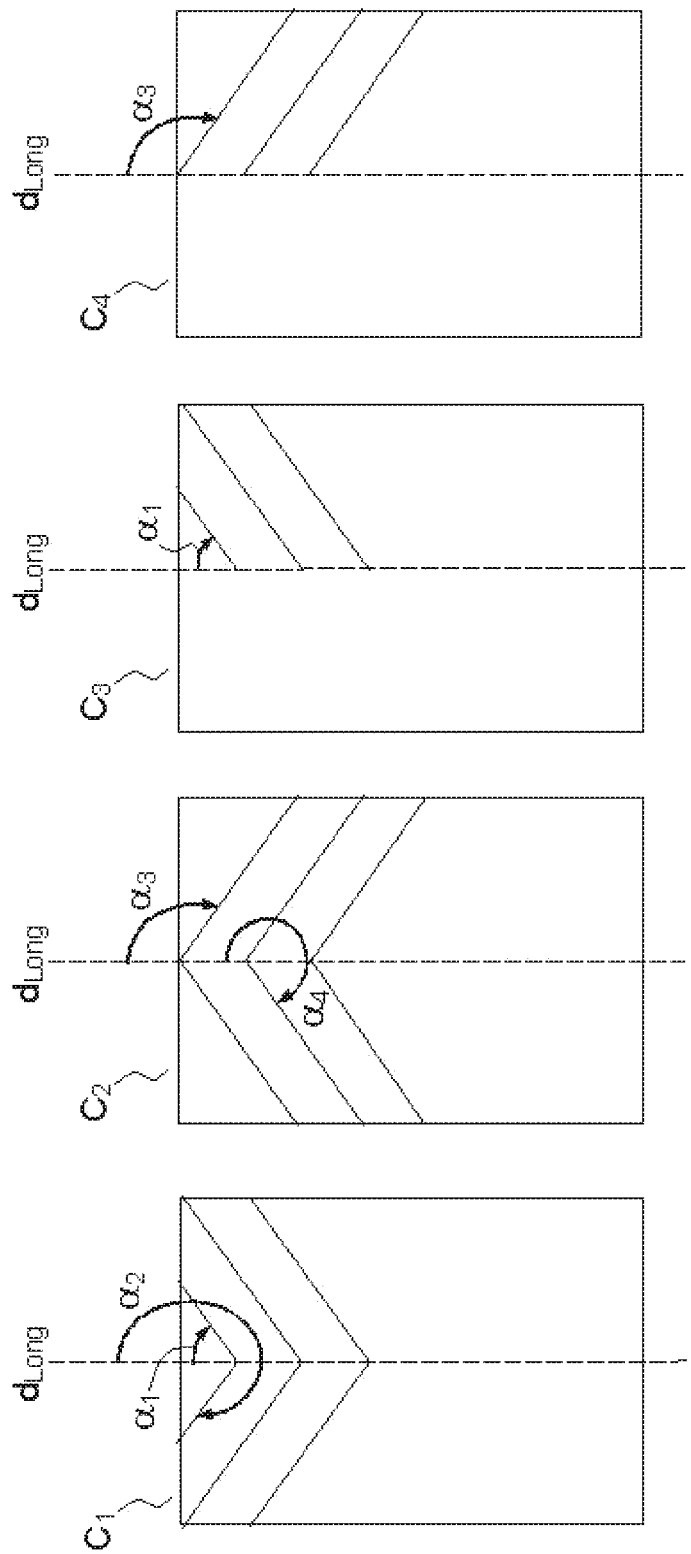
FIG. 8 is a schematic depiction of a first embodiment of the tape according to one aspect of the invention, FIG. 9 proposes a variant of the first embodiment, FIGS. 10a and 10b propose another variant of the first embodiment.

FIG. 8 depicts a first embodiment of the invention. In this particular instance, the stack Emp comprises four layers C1, C2, C3 and C4, each of them exhibiting longitudinal symmetry of the fibres.

The first layer of the stack C1 comprises two parts the direction of the fibres of which is symmetric with respect to the longitudinal direction $d_{Long}$.

In this case, the first part P11 of the first layer C1 comprises a first material Mat1 having a first type of fibres of which the direction forms a first angular offset +α1 with the longitudinal direction $d_{Long}$. The second part P21, symmetric with respect to the longitudinal direction, comprises the first material Mat1 of which the direction of the first type of fibres forms a second angular offset +α2, the second angular offset +α2 corresponding to 2π−α, or to −α1 in the anticlockwise direction.

The second layer of the stack C2 also comprises two symmetric parts respectively situated facing the two parts of the first layer C1.

The first part P12 of the second layer C2 comprises the first material Mat1 having the first type of fibres of which the direction forms a third angular offset +α3 with the longitudinal direction $d_{Long}$, +α3 corresponding to π−α1. The second part P22 which is symmetric with respect to the longitudinal direction $d_{Long}$ comprises the first material Mat1 of which the direction of the fibres forms a fourth angular offset +α4 with respect to the longitudinal direction $d_{Long}$, the fourth angular offset +α4 corresponding to π+α1.

The third layer C3 is identical to the first layer C1 and the fourth layer C4 is identical to the second layer C2.

According to a first variant of the invention, which has not been depicted in the figures, the second part P21 comprises a second material Mat2 with an expansion coefficient substantially equal to that of the first material Matt. The second material Mat2 has a second type of fibres.

The first part P21 of the first layer C1 comprises the material Matt as in the previous case, depicted in FIG. 8. The second part P22, symmetric with respect to the longitudinal direction, comprises the second material Mat2 of which the direction of the second type of fibres forms the second angular offset +α2, the second angular offset corresponding to 2π−α1, as before.

The second layer C2 of the stack also comprises two symmetric parts situated respectively facing the two parts of the first layer C1.

The first part P12 of the second layer C2 comprises the second material Mat2 having the second type of fibres the direction of which forms a third angular offset +α3 with the longitudinal direction in the clockwise direction, +α3 corresponding to π−α1. The second part P22 symmetric with respect to the longitudinal direction comprises the first material Matt of which the direction of the first type of fibres forms a fourth angular offset +α4, the fourth angular offset +α4 corresponding to π+α1.

Figure 9:
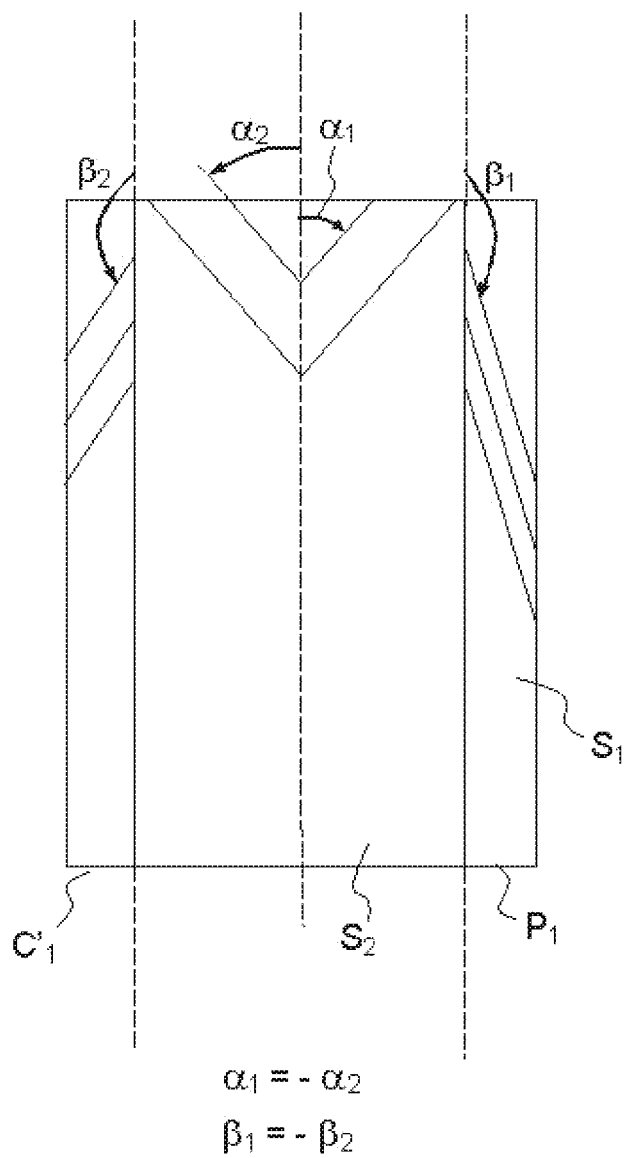

According to another variant of the invention depicted in FIG. 9, the first and second parts are split into at least two segments S1 and S2.

In this particular instance, the first part P11 of the first layer C1 is split into two segments S1 and S2 in the longitudinal direction $d_{Long}$.

The first segment S1 comprises the first material Matt of which the orientation of the fibres forms a first angular offset +α1 with the longitudinal direction. The second segment S2 comprises a fibrous third material Mat 4 of which the orientation of the fibres forms a fifth angular offset (31 with the longitudinal direction.

The second part P12 of the first layer has longitudinal symmetry. It comprises two segments S1 and S2 comprising the first and third material. The orientation of each type of fibre in each of the parts is respectively longitudinally symmetric.

The stack on the first part of four layers comprising two segments can be summarized as follows ($\alpha 1$; $\beta 1$), ($\pi-\alpha 1$; $\pi-\beta 1$), ($\alpha 1$; $\beta 1$), ($\pi-\alpha 1$; $\pi-\beta 1$).

Figure 10:
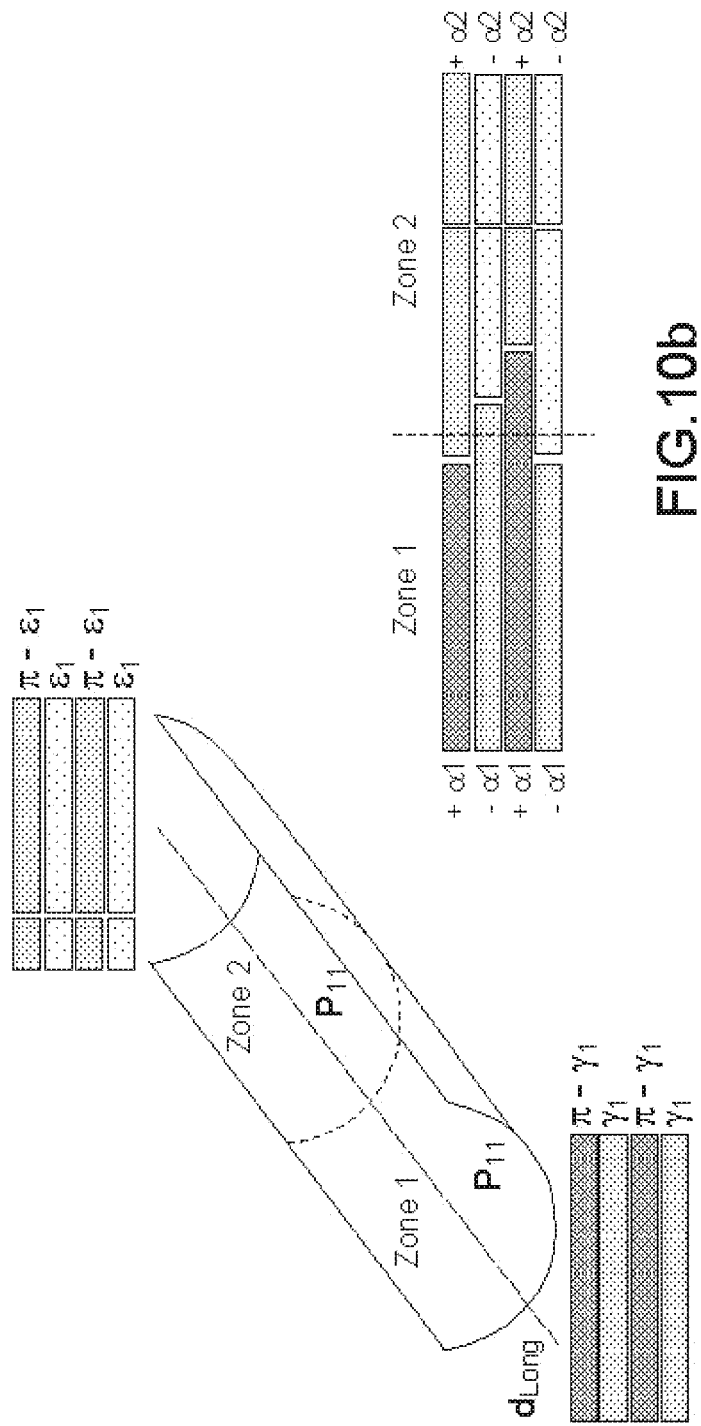

In another variant depicted in FIG. 10a, the tape 1 of which the direction of the fibres is symmetric with respect to the longitudinal direction $d_{Long}$ comprises a plurality of zones in a transverse direction $d_{Transv}$ perpendicular to the longitudinal direction $d_{Long}$.

In this instance, the tape comprises two zones Z1 and Z2. The first zone Z1 of the first layer C1 has longitudinal symmetry between the first P11 and the second P12 part. For the sake of making FIG. 10a easier to understand, the longitudinal symmetry of the fibres has not been depicted in this figure.

The first part P11 of the first layer C1 of the first zone Z1 comprises a fifth material Mat5 of which the orientation of the fibres forms a sixth angular offset with the longitudinal direction of value $\gamma 1$. The stack on the first part P11 of the first zone Z1 comprises the fifth material and the orientation of the fibres alternates between the values ($+\gamma 1$) and ($\pi-\gamma 1$). The second part P21 of the first layer C1 of the first zone Z1 is longitudinally symmetric.

The first part P11 of the first layer C1 of the second zone Z2 comprises a sixth material Mat6 of which the orientation of the fibres forms a seventh angular offset $\epsilon 1$ with the longitudinal direction $d_{Long}$. The stack on the first part P11 of the first zone Z1 comprises the fifth material and the orientation of the fibres alternates between the values ($+\epsilon 1$) and ($\pi-\epsilon 1$). The second part P21 of the first layer C1 of the first zone Z1 is longitudinally symmetric.

Advantageously, the boundary between the zones comprising different materials is not linear, as has been depicted in FIG. 10b. There is a section of tape in which the two materials overlap so as not to create a zone of weakness in the tape 1 or, in other words, zones in which kinking or tearing could occur.

Figures 11, 12:
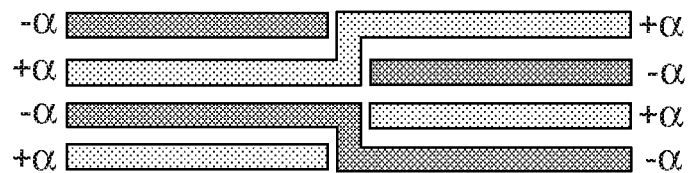
FIG. 11 depicts another variant of the first embodiment.
FIG. 12 depicts another variant of the first embodiment.

According to another variant, depicted in FIG. 11, the two parts P1 and P2 of the tape 1 are connected using at least one of the layers Cn of the stack Emp. In this particular instance, the stack Emp comprises four layers having symmetry of the orientation of the longitudinal fibres; the first part of one layer P1n and the second part of the next layer P2n+1 are monolithic. In this instance, the first part of the first layer P11 and the second part of the second layer P22 are monolithic as are the second part of the third layer P23 and the first part of the fourth layer P14.

The stack Emp could potentially further comprise a substrate on which the first layer C1 extends. Advantageously, the stack Emp further comprises a non-fibrous layer or a layer in which the fibres are parallel to the longitudinal direction, which layer is interposed between two fibrous layers of the stack Emp, FIG. 12.

Advantageously, the radius of curvature of the cross section Sec of the tape in a transverse direction $d_{Transv}$ perpendicular to the longitudinal direction $d_{Long}$ varies in the longitudinal direction $d_{Long}$ and/or in the transverse direction $d_{Transv}$.

Advantageously, the width of the tape varies in the longitudinal direction so as to vary the radius of curvature of the winding.

Figure 13:
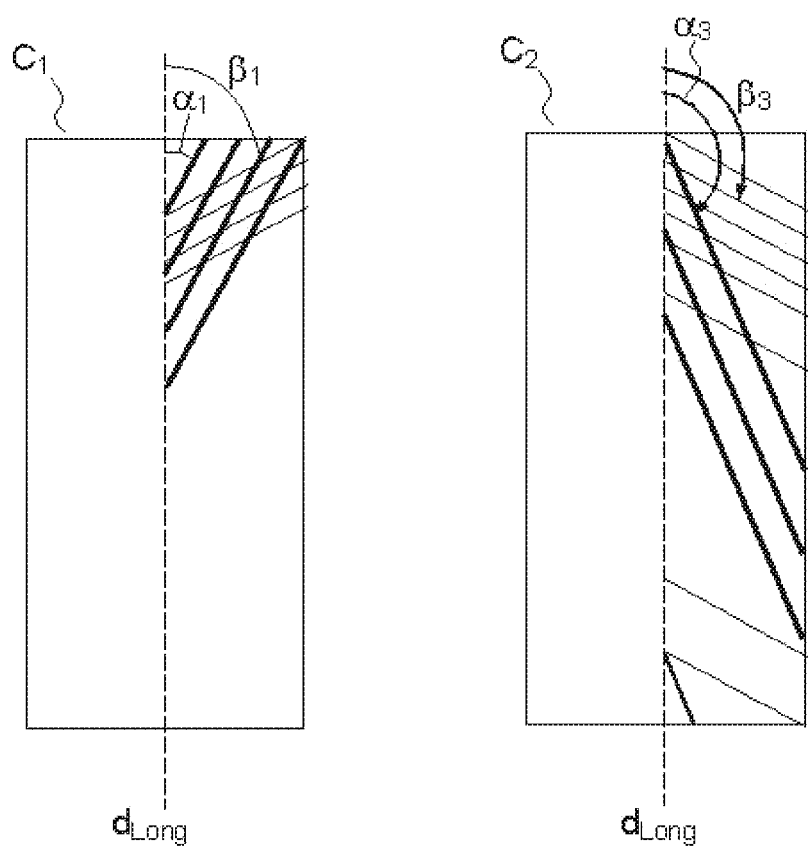
FIG. 13 depicts a second embodiment of the tape comprising at least two layers, according to one aspect of the invention.

According to a second embodiment depicted in FIG. 13, the stack Emp comprises at least two fibrous layers C1; C2 comprising the first material Mat1 comprising two types of fibre, each type of fibre being oriented in a single direction.

In this case, the first part P11 of the first layer C1 comprises a sixth material Mat 6 comprising a first type of fibre of which the direction forms a first angular offset $\alpha 1$ with the longitudinal direction $d_{Long}$ and a second type of fibre of which the direction forms a second angular offset $\beta 1$ with the longitudinal direction.

The second part P21 of the first layer C1 comprises the sixth material Mat 6. The directions of the first and second types of fibre of the first and second parts are longitudinally symmetric respectively.

The first part P12 of the second layer C2 comprises the sixth material Mat6, the direction of the first type of fibres forms a fifth angular offset $\alpha 3$ corresponding to $\pi-\alpha 1$ with the longitudinal direction $d_{Long}$ and the direction of the second type of fibres forms a sixth angular offset $\beta 3$, corresponding to $\pi-\beta 1$ with respect to the longitudinal direction $d_{Long}$.

The invention solves the technical problem by proposing a solution for limiting the torsion generated by variations in temperature.

The invention claimed is:

1. A tape configured for space applications exhibiting variations in temperature which may be as high as 300° C., the tape configured to have a fully wound stable state during a deployment process, a fully unwound stable state during the deployment process, and intermediate states during the deployment process, the intermediate states being between the fully wound state and the fully unwound state and comprising a single continuous portion of wound tape with a first radius of curvature greater than a threshold value and a single continuous portion of unwound tape with a second radius of curvature less than the threshold value, the value of the second radius of curvature being continuous over the unwound portion; the tape comprises a stack comprising fibrous layers extending in a longitudinal direction, the said resulting stack having symmetry with respect to a longitudinal plane of its fibres to compensate for torsional deformations generated by variations in temperature;
   wherein the stack comprises at least two layers, the layers comprising a same first material comprising two types of unidirectional fibres, with different directions.

2. The tape according to claim 1, wherein the threshold value is dependent on physicochemical characteristics of the materials of which the tape is made.

3. The tape according to claim 1, wherein the unwound portion is rectilinear.

4. The tape according to claim 1, wherein the stack comprises:
   a first layer comprising two parts of which the fibres of the two parts have a longitudinally symmetric orientation, and of which a first part is equipped with a first type of fibres forming a first angular offset and with a second type of fibres forming a second angular offset with respect to the longitudinal direction, and
   a second layer comprising two symmetric parts positioned respectively facing the two symmetric parts of the first layer comprising the first type of fibres forming a fifth angular offset with the longitudinal direction and the second type of fibres forming a sixth angular offset with the longitudinal direction, the first angular offset and the fifth angular offset being supplementary angles.

5. The tape according to claim 1, wherein the stack comprises at least four layers, the layers comprising at least one material comprising unidirectional fibres.

6. The tape according to claim 5, wherein the stack comprises:
a first layer comprising two parts of which the fibres of the two parts have a longitudinally symmetric orientation and of which a first part comprising at least a first material comprising fibres forming a first angular offset with respect to the longitudinal direction and a second part comprising at least a second material, and
a second layer comprising two symmetric parts positioned respectively facing the two symmetric parts of the first layer and of which a first part comprises the second material, the fibres of the second material forming a third angular offset with the longitudinal direction, the first angular offset and the third angular offset being supplementary angles,
the third layer is identical to the first layer and the fourth layer is identical to the second layer, the first material and the second material having substantially identical expansion coefficients.

7. The tape according to claim 6, wherein the first and second materials are identical.

8. The tape according to claim 1, comprising at least two consecutive layers of which the first part of one and the second part of the other are monolithic.

9. The tape according to claim 1, further comprising a substrate on which the first layer of the stack is positioned.

10. The tape according to claim 1, further comprising a layer comprising a nonwoven material interposed between two layers of the stack comprising a material comprising fibres.

11. The tape according to claim 1, wherein the layers comprise at least two segments separated in a transverse direction perpendicular to the longitudinal direction and comprising different fibrous materials.

12. The tape according to claim 1, wherein the width of the tape in the transverse direction varies in the longitudinal direction.

13. The tape according to claim 1, wherein the radius of curvature in the transverse direction of the tape on the unwound portion varies in the transverse and/or longitudinal direction.

14. The tape according to claim 1, wherein the tape is a bistable tape.

* * * * *